Dec. 28, 1926.

O. R. DAILEY 1,612,100

DISPLAY CABINET

Filed May 24, 1926

Inventor
O. R. Dailey
By Davis & Davis
Attorneys

Patented Dec. 28, 1926.

1,612,100

UNITED STATES PATENT OFFICE.

OWEN R. DAILEY, OF DAVENPORT, IOWA, ASSIGNOR OF ONE-HALF TO PETER BENDIXEN, OF DAVENPORT, IOWA.

DISPLAY CABINET.

Application filed May 24, 1926. Serial No. 111,316.

The object of this invention is to provide a cabinet in which may be effectively displayed women's garments and other articles, as more fully hereinafter set forth.

In the drawing—

Figure 1:
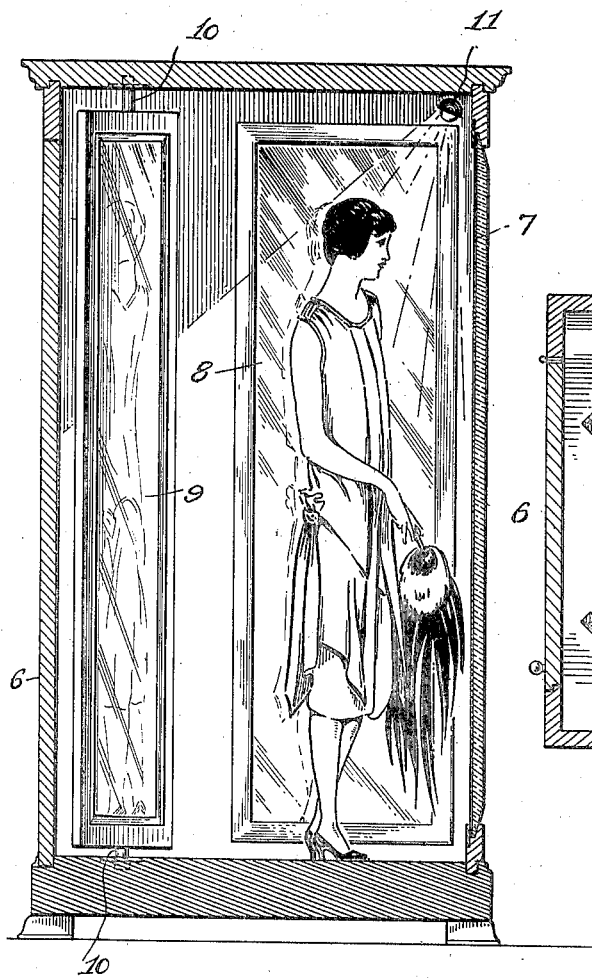
Fig. 1 is a vertical sectional view.

In the drawing, 5 designates a cabinet having a door 6 in its back-wall and a mirror 7 in its front-wall and also mirrors 8 in its side-walls. Additional mirrors 9 are arranged in the interior of the cabinet near the back-wall, these mirrors being pivotally mounted on pivots 10 at their upper and lower ends to permit the mirrors to be swung about on vertical axes.

The front and side mirrors are the type which are not only transparent but are also capable of reflecting from either face of the glass, i. e., backwardly as well as forwardly. These mirrors are desirably made in accordance with the process defined in my copending application Serial No. 111,315, filed May 24, 1926. The mirrors 9 may be ordinary single-face mirrors.

A suitable illuminating device 11 is placed in the cabinet, the best location for this being at the upper forward corner of the cabinet, so that the light-rays will be reflected downwardly on the face of the model or manikin adorned with the garment to be displayed, the model or manikin being positioned on the bottom of the cabinet immediately behind the mirror 7, at a point between the two mirrors 8.

When the lamp 11 is extinguished, the interior of the cabinet is dark and, therefore, nothing can be seen on looking through the mirrors; the mirrors serve merely as mirrors and, being of full length, i. e., the length of cheval-mirrors, they are themselves attractive to passers-by. When, however, the interior of the cabinet is illuminated, the three front mirrors become transparent, thereby permitting the object on display to be viewed directly through the mirrors, as with ordinary transparent glass. The rear mirrors 9 then come into use. These rear mirrors are adjustable, as set forth, to produce a great variety of effects. These back mirrors not only reflect back views of the object on display taken from various angles, but they also receive and reflect the image of the object reflected from the rear-face of the front duplex mirror 6, thereby permitting a front-view of the object on display to be pictured a plurality of times. It will therefore be observed that by thus employing a duplex transparent mirror in the front-wall of the cabinet and a supplemental adjustable mirror at the back, a very complete as well as attractive and puzzling exhibition of the garment or other article may be produced. In practice, it is intended that the illuminating device shall be intermittently actuated, so that at intervals the mirrors 7 and 8 shall act merely as ordinary mirrors, while in the other intervals the unique display aforedescribed will suddenly come to the view of those who may be looking at their reflections in the mirrors.

Figure 2:
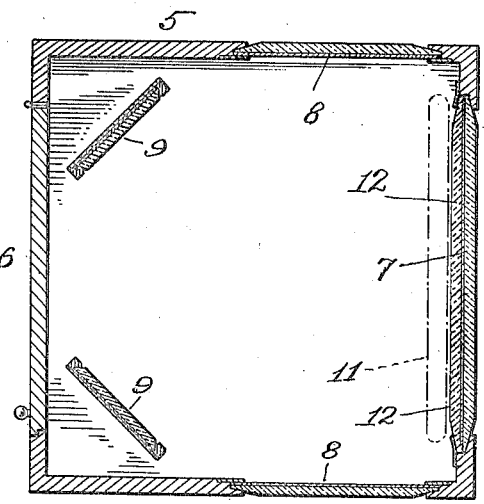
Fig. 2 is a horizontal sectional view embodying one form of my invention.

It will be understood that it is generally desirable to back the front and side mirrors, for protective purposes, with a plain ordinary sheet of glass, as shown at 12, Fig. 2.

What I claim as new is:

A display cabinet embodying a casing having a duplex transparent mirror in its front-wall, a reflecting mirror in the back part of the casing positioned to receive and reflect the image reflected backwardly by said front mirror, and an illuminating device in the cabinet.

In testimony whereof I hereunto affix my signature.

OWEN R. DAILEY.